United States Patent [19]  [11] 4,000,564
Haffner et al.  [45] Jan. 4, 1977

[54] PROGRAMMABLE ANTHROPOMORPHIC ARTICULATION

[75] Inventors: Mark P. Haffner, New Carrollton, Md.; Robert S. Pizer, Washington, D.C.

[73] Assignee: The United States of America as represented by the Secretary of the Department of Transportation, Washington, D.C.

[22] Filed: Jan. 7, 1976

[21] Appl. No.: 647,317

[52] U.S. Cl. .................................................. 35/17
[51] Int. Cl.² ........................................ G09B 23/32
[58] Field of Search ............. 35/17; 73/12, 432 SD

[56] References Cited
UNITED STATES PATENTS

| 3,557,471 | 1/1971 | Payne | 35/17 |
| 3,755,920 | 9/1973 | Smrcka | 35/17 |
| 3,895,451 | 7/1975 | Smrcka | 35/17 |

Primary Examiner—Harland S. Skogquist
Attorney, Agent, or Firm—Herbert E. Farmer; Harold P. Deeley, Jr.

[57] ABSTRACT

An anthropomorphic programmable joint joins two limb portions. The joint may simulate the knee joint and the portions may correspond to the upper and lower leg portions about the knee. A magnetic particle brake is attached to the upper portion with a shaft that carries the pinion gear of a bevel gear set located at the joint. The ring gear of the bevel gear set is fixed to the lower limb portion so that rotation of the lower limb portion about the joint causes the shaft to rotate the magnetic brake fixed to the upper portion. The brake resistance to this rotation, and therefore the resistance of the joint to rotation, may be programmed in correspondence to electrical current applied to the brake.

7 Claims, 6 Drawing Figures

PROGRAMMABLE ANTHROPOMORPHIC ARTICULATION

ORGIN OF THE INVENTION

The invention described herein was made by employees of the United States Government and may be manufactured and used by or for the government for governmental purposes without the payment of any royalties thereon or therefor.

BACKGROUND OF THE INVENTION

It is known to use simulated joints, particularly for test purposes. For example, a dummy may be carried in a test sled or vehicle and the vehicle may be advanced against an obstruction to simulate a crash. In testing, a dummy leg may, for example, be employed. The simulated knee joint should have a resistance comparable to that of a real knee joint to enhance its utility in the tests and to afford insight into the response of a human joint in real crashes.

Heretofore, a simple joint has been used which displays a frictional resistance to flexure. The frictional force may be adjustable. Nevertheless, there are difficulties involved in the use of frictional joints. Repeatability of setting is difficult. The frictional forces resisting the flexure cannot be programmed variably with time in a desired manner, but are dependent on initial settings. Wear gives rise to non-repeatable settings and to nonuniformity. Such frictional joints are velocity sensitive and exhibit torque spiking at the static-kinetic transition. The frictional joint also makes it difficult to fix the dummy in position in the sled or vehicle.

BRIEF SUMMARY OF THE INVENTION

According to the invention, a joint has two limb portions and a magnetic particle brake responsive to current is carried on a limb portion mechanically coupled to the joint, so that the resistance of the limb rotation to relative motion in a selected plane about the joint is responsive to the brake current. The brake current can be programmed in accordance with a desired profile, thereby to program the brake resistance to rotation correspondingly. The brake may, if desired, advantageously be carried on a limb portion remote from the joint.

The invention and its advantages and novel features will be better understood from the following description when read in connection with the accompanying drawings in which:

DETAILED DESCRIPTION

Figure 1:
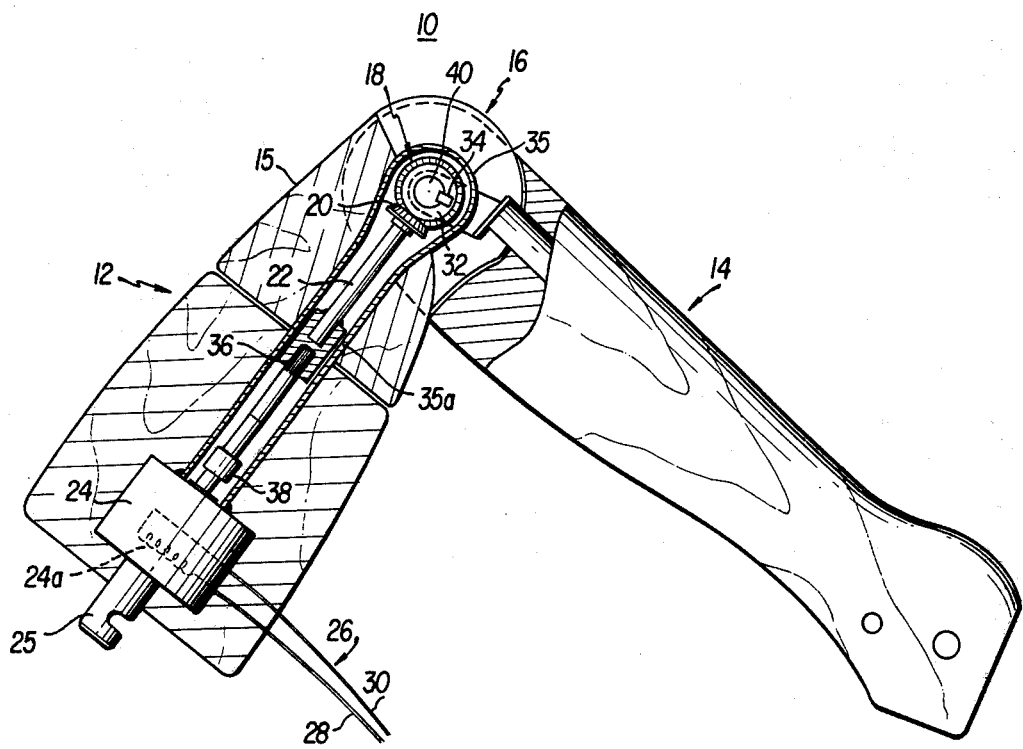
FIG. 1 is a perspective view of a simulated human leg including the simulated knee joint and upper and lower leg portions about the joint, partially broken away.

Referring now to FIG. 1, a simulated leg 10 has an upper portion 12 and a lower portion 14 in a housing 15. In the joint 16 is a bevel gear set 18, the pinion gear 20 of which is connected by a shaft 22 to a magnetic particle brake 24. The brake 24 may be controlled by current applied through a pair of leads 26 connected to terminals 28 and 30. An inductor 24a connected between leads 26 represents the windings and inductance of the brake 24. The ring gear 32 of the bevel gear set 18 is connected to the lower leg portion 14 by a key (not shown) resting in a keyway 34 of the ring gear shaft or by any suitable mechanical linkage. Shaft 22 may further carry a splined coupling 36 which rotatably couples to the magnetic particle brake 24. The spline coupling couples the shaft 22 to the input shaft 38 of the magnetic brake. The axis 40 of the ring gear 32 is arranged normal to the sagittal plane of the simulated leg joint. The gear set housing 35 is connected by a structural tube 35a to the brake housing. An elongation 25 from the brake housing serves for attachment to the hip. The housing 35 and tube 35a serve to transmit knee impact beyond or around the gear set 18 and spline coupling 38 to the brake housing.

Accordingly, in operation, when the lower leg portion 14 is flexed or rotated in the sagittal plane in relation to the upper leg portion 12, the bevel gear set coverts this rotation into rotation of the shaft 22 from the pinion gear and via the spline coupling 36 to the input shaft 38 of the magnetic particle brake 24. The resistance to the rotation about the simulated joint 16 accordingly depends upon the current applied to the magnetic particle brake 24 and upon the gear set ratio. It will also be apparent that the impact forces of the knee with an external object or surface are transmitted to the hip attachment via the structural tube 35a and the magnetic brake 24 housing and do not affect or load the gear set 18 or magnetic brake rotor or shaft 38. Accordingly, the gears 32 and 20 and the bearings and rotor shaft 38 of the magnetic particle brake 24 are isolated from the load transmission path on impact and are thus protected from impact.

Figure 2:
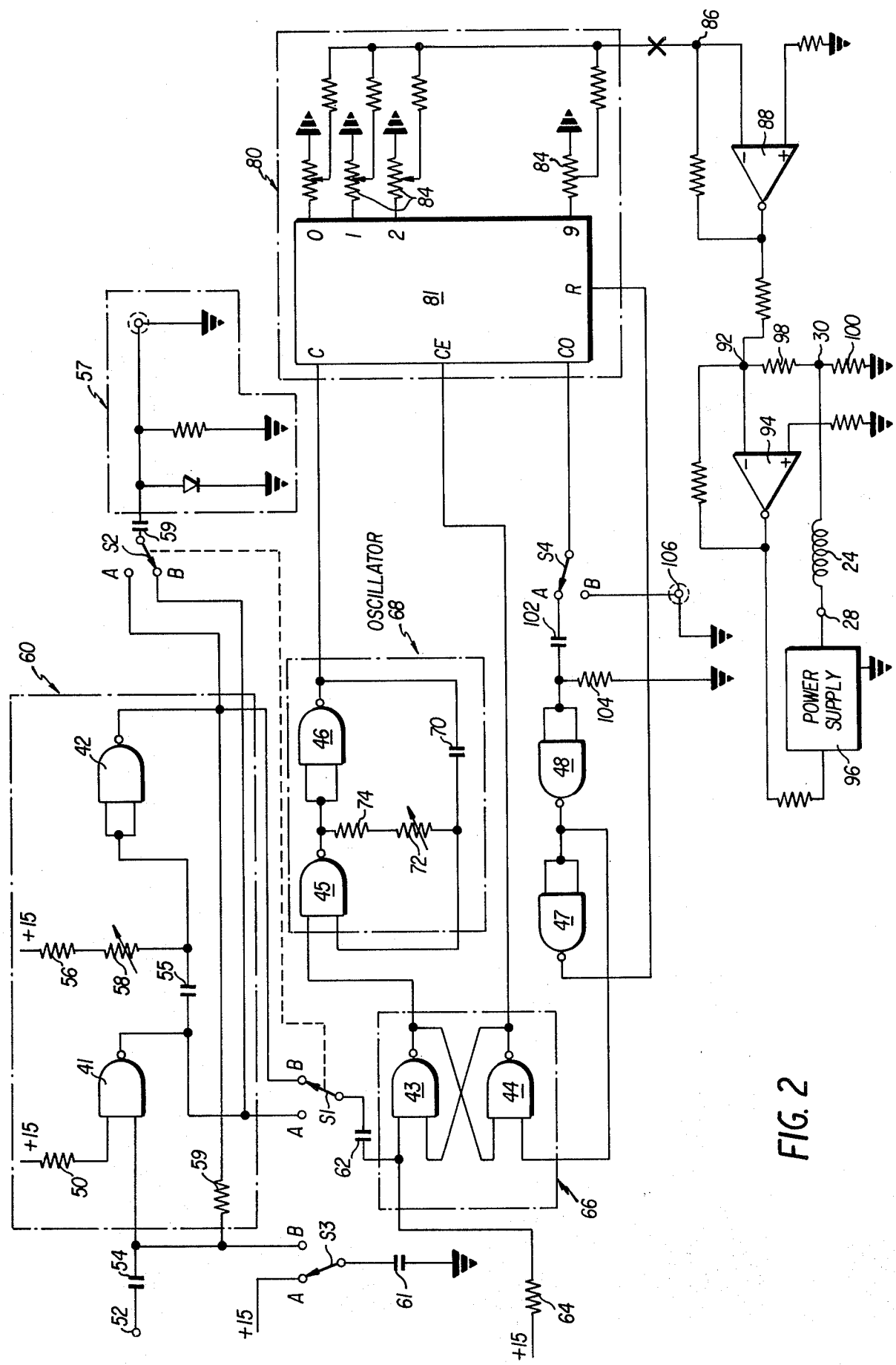
FIG. 2 is a circuit schematic illustrating a control circuit for the magnetic particle brake shown in FIG. 1.

Referring now to FIG. 2, eight two-input inverting gates are shown indicated by reference numerals 41 to 48 inclusive. These are all two input gates and may be the type CD4011A (packaging four gates in a package) and may be secured from RCA Corporation. One input to gate 41 is applied from a positive 15 volt supply (power supplies are omitted) through a 100 kilohm resistor 50 to gate 41. Another input to gate 41 is applied from a terminal 52 through a 0.01 microfarad capacitor 54. The output of gate 41 is applied through a 0.1 microfarad capacitor 55 to both inputs of the gate 42 and terminal A of a switch S1. The +50 volt supply is connected through a 100 kilohm resistor 56 and a second variable resistor 58 (maximum value 1 megohm) connected in tandem therewith to the junction between capacitor 55 and the two inputs to gate 42. The output of gate 42 is connected to terminal A of a switch S2, to terminal B of a switch S1 which is ganged to switch S2, and to one terminal of a resistor 59. The other terminal of resistor 59 is connected to a terminal B of a single pole, double-throw switch S3 and also to the same input of gate 41 which is connected to capacitor 54. Both switches S1 and S2 are single-pole, double-throw switches. The single pole of switch S2 is connected to a circuit at 57 consisting of a 0.01 microfarad capacitor 59 having one terminal connected to the single pole of switch S2 and the other terminal connected to an output of a coaxial line and also via a diode type 1N34 to ground and a 47 kilohm resistor to ground. The circuit 57 is for providing synchronizing pulses to an oscilloscope for observation and need not be further described.

Terminal A of switch S1 is connected to the junction between the output of gate 41 and capacitor 55. Terminal A of switch S1 is also connected directly to terminal B of switch S2. The third single-pole, double-throw switch S3 has one terminal A connected to the +15 volt supply and another terminal B connected to the junction between the input capacitor 54 and that input terminal of gate 41 to which the capacitor 54 is connected, as before described. The pole of switch S3 is connected via a capacitor 61 to ground.

Connecting the pole of switch S3 to terminal B from terminal A injects a positive pulse from capacitor 61 into the junction of capacitor 54 and the input of gate 41, turning on the one-shot delay multivibrator composed of gates 41 and 42. The output of gate 42 connects to terminal A of switch S2 for a delayed snychronizing pulse pick-off for circuit 57.

The gates 41 and 42 with their associated circuitry comprise a variable start delay circuit which can be triggered by a positive pulse, for example, a terminal 52, or by throwing switch S3 to its terminal B. Under these conditions, such a positive pulse causes a negative pulse to appear at the output of gate 41 which thereby causes the output of gate 42 to become positive. After a time delay determined by the setting of the variable resistor 58, a negative initiating pulse appears at the output of gate 42 and with switch S1 thrown to terminal B as shown causes initiation of a current generating circuit of desired wave forms described later. This arrangement also permits synchronization with an initiating pulse at terminal 52 which may be arranged to correspond to initiation of mechanical motion or at impact of the vehicle carrying the dummy. On the other hand, if it is desired to initiate the circuit independently, it may be done by means of switch S3 being thrown from terminal A to terminal B with switch S1 connected to its terminal A. Under these conditions, because the capacitor 61 has been charged from the positive 15 volt supply, a negative pulse will appear at the output of gate 41 which is passed through terminal A of switch S1 to actuate the succeeding circuitry.

Gates 43 and 44 are cross coupled with the output of each being fed back to one input of the other. The positive 15 volt supply is connected through a 100 kilohm resistor 64 to the junction of capacitor 62 and the other input to gate 43. The second input to gate 44 is received from the output of gate 48. Assuming the second input to gate 44 to be high, the pair of gates 43 and 44 operate as a bistable circuit which changes state in response to each negative input pulse received alternately through capacitor 62, and the second input of gate 44.

Gates 45 and 46 are connected together as a free-running multivibrator or oscillator 68 which may be enabled or disabled in accordance with the output received at gate 45 from the output of gate 43. The output of gate 45 is connected to both inputs of gate 46. The output of gate 46 is connected by a 0.001 microfarad capacitor 70 to the other input of gate 45. The junction between capacitor 70 and the gate 45 input is connected through a variable resistor 72 in tandem with a 100 kilohm resistor 74 to the junction between the output of gate 45 and the inputs of gate 46. The maximum resistance of resistor 72 is one megohm. So long as the input to the free-running multivibrator 68 received from the bistable circuit 66 at the output of gate 43 is in its high state, the free-running multivibrator 68 will generate pulses at a repetition rate controlled by the setting of the variable resistor 72. When this output of the bistable circuit 66 from gate 43 becomes low, the free-running multivibrator 68 is inhibited and can no longer generate pulses. The output of the free-running multivibrator 68 from the gate 46 is applied to the count terminal C of a decade counter and wave form generator 80. The decade counter 81 may be type CD4017A such as may be secured from RCA Corporation. As the count is advanced for each positive going pulse on the count terminal C starting from an initial reset condition, each of the decade counter output terminals 0 to 9 inclusive assumes a relatively high voltage in turn.

To each of the 0 to 9 terminals of the decade counter is connected a respective potentiometer 84, the 20 kilohm resistance of which is connected between the respective decade counter output terminal and ground. Each tap from each potentiometer leads off to a respective 100 kilohm resistor. The remaining terminals of these last-named resistors are all connected together at junction 86.

At the carry-out output terminal of the decade counter at each tenth pulse is a positive going voltage which appears at the pole of switch S4. The A terminal of switch S4 is connected through a capacitor 102 to both inputs of gate 48. The junction of capacitor 102 and the inputs of gate 48 are connected through a 22 kilohm resistor 104 to ground. The output of gate 48 is connected to the remaining input of gate 44 (that is not cross-coupled to gate 43). The output of gate 48 is also connected to both inputs of gate 47. The output of gate 47 is connected to the reset input R of the decade counter. Terminal B of switch S4 is connected to the inner conductor 106 of a coaxial line, the outer conductor of which is grounded. With the switch S4 in position B the test terminate pulse from the counter carry-out at terminal 106 is used to snychronize an oscilloscope, and the counter 81 runs repetitively for shape adjust with the oscilloscope.

The junction 86 is connected to the inverting input terminal of an amplifier 88. A 33kilohm resistor is connected from the output of amplifier 88 to junction 86. A bias resistor of 15 kilohms is connected from the non-inverting input terminal of the amplifier 88 to ground. The output of amplifier 88 is applied through a 47 kilohm resistor to a junction point 92 connected to the inverting input of an amplifier 94. The non-inverting input terminal of amplifier 94 is connected through a 4.7 kilohm resistor to ground. The output of amplifier 94 is connected through a 4.7 kilohm resistor to the junction point and input 92. The output of the amplifier 94 is also connected through a 3 kilohm resistor to the input of a voltage controlled power supply 96. This power supply may be of any well known voltage responsive type.

The power supply used in the circuit was supplied by kepco of Flushing, N.Y., being their type OPS75-8M. The output of power supply 96 is applied to the terminal 28 of the magnetic particle brake 24. The other terminal 30 of the brake 24 is connected through a 6,8 kilohm resistor to the input 92 of amplifier 94. The terminal 30 is connected through a 0.25 ohm current sampling resistor 100 to ground.

In operation, assume that the bistable flip-flop or circuit 66 receives a high voltage at the input from gate 44. Assume, however, that the output of gate is low. When a negative pulse is received via capacitor 62 at the input of gate 43, the output of gate 43 goes high and the free-running multivibrator 68 may now commence to generate pulses. At the same time, the enable input CE of the decade counter 81 goes low which permits the decade counter to respond to the count pulses applied to its terminal C from gate 46 of the free-running multivibrator 68. Each terminal 0 to 9 in turn assumes a high voltage and that voltage is tapped off by the various taps 84 and applied during successive time intervals to input junction 86 of amplifier 88.

Because of the value selected for the feedback resistor between the input and output of amplifier 88 and the 100 kilohm resistor from tap 84 of each output of the decade counter, it will be apparent that there is a gain of approximately 0.33 in the amplifier 88. Because the input is applied to the inverting input terminal of amplifier 88, the output is inverted. Accordingly, a negative polarity voltage appears at the output of amplifier 88 corresponding in each successive time interval to the voltage appearing on each of the decade counter output terminals. These negative voltages are now applied via the 47 kilohm resistor to junction 92 and the inverting input of amplifier 94. The 4.7 kilohm feedback resistor between the output and the input of the amplifier 94 together with the ground voltage applied via the 4.7 kilohm resistor to the non-inverting input of amplifier 94 effectively forces the junction 92 to assume a substantially ground voltage. Accordingly, from the negative going voltage applied at junction 92 from amplifier 88 is subtracted the positive going voltage that is developed at terminal 30 by current through brake 24 across the 0.25 ohm current sampling resistor 100. In effect, the feedback circuit requires the current as sampled across the sampling resistor to follow the wave form of the voltages developed successively across the ten output terminals of the decade counter. Smoothing may be accomplished with the addition of a smoothing filter, if desired. A certain amount of smoothing is afforded because of the high inductance of the magnetic particle brake 24. The output of amplifier 94 is applied through a 3 kilohm resistor to the input of the power supply 96 as heretofore explained, and therefore the power supply current output through the brake 24 is controlled in accordance with the successive input voltages from the decade counter.

Since the taps at the output of the various resistors connected to the decade counter outputs may be set arbitrarily, it is apparent that any desired wave form in this example in ten equal time segments may be developed as a current wave form from the power supply 96. Other segments may be selected, or other wave form generators obviously may be used, the arrangements shown here being by way of example.

When the tenth count has been reached on the decade counter, a positive output pulse is developed at the pole of switch S4 from the carry-over terminal CO of the decade counter. This positive output pulse may be applied via terminal A of switch S4 to both inputs of gate 48 causing the output of gate 48 to go low. This low output at gate 48 applied to the inputs of gate 44 now causes the output of gate 44 to go high and therfore the output of gate to go low, the negative pulse from capacitor 62 having passed. The consequent low voltage applied to gate 45 disables the free-running multivibrator 68 which can no longer apply pulses to the decade counter 81. If the switch S4 is turned to terminal B, the output of gate 48 becomes and remains high because of the input from gound via resistor 104 and the free-running multivibrator simply runs continuously. This may be done for test purposes and to observe the wave forms of the oscilloscope repetitively.

As a result of the arrangement, before any voltage is applied to the power supply 96, the simulated leg joint may articulate freely and a dummy which has such a leg joint may be positioned accurately in the test vehicle before the joints are activated. Moreover, if desired, the joint may be easily and precisely set for any desired resistive value up to the capacity of the design.

Another advantage of the arrangement illustrated is that the center of gravity despite the addition of the clutch and gearing may simulate the centers of gravity of the two leg portions of a person, the weight of the clutch and gearing being relatively sufficiently small so as to permit any reasonable desired location and total weight distributions. As the joint is electrically controlled, greater resolution of wave form or response can be obtained, if desired by increasing the segments from ten to a greater number. If desired, the joint can be operated at a constant torque by applying a constant current to the magnetic particle brake 24. Nevertheless, electronic control permits the joint to be programmed to generate substantially any desired complex torque profile within design limits. As one example, the joint may be programmed to simulate observed human torque response in a selected crash environment. It is also possible to use position and velocity feedback from sensors in the joint to control the torque profile by controlling the magnetic particle brake 24 rather than by employing the circuit here illustrated.

Figure 3:
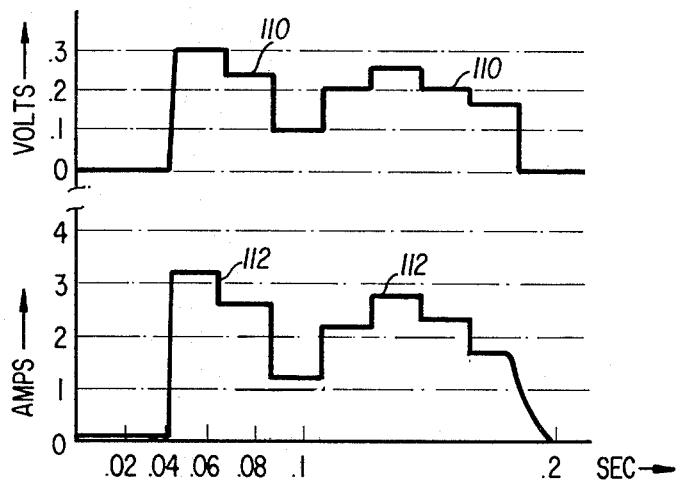
FIG. 3 are curves somewhat idealized illustrating wave forms of the control voltage at the output of a voltage programmer and the resultant current in the magnetic particle brake.

Referring now to FIG. 3, there is illustrated in the upper portion of the drawing an idealized oscilloscope trace illustrating the voltage applied by the wave form generator 80. In this instance, the potentiometers connected to the terminals 0, 1, and 9 of the decade counter have been set to zero or ground. The decade counter 2 potentiometer 84 has been set to provide an output of 0.3 volts, the potentiometers 84 connected to the 3 terminal has been set to approximately 0.25 volts, the one connected to the 4 terminal to approximately 0.2 volt, the one of the 5 terminal to about 0.25 volt, the one to the 6 terminal to 0.2 volt, the one to the 7 terminal about 0.19 volt and the one to the 8 terminal about 0.15 volt. These settings provide voltage output at the junctions 86 as illustrated in the upper curve 110. On the same time base in the lower portion of FIG. 3 is illustrated an idealized oscilloscope trace 112 of the resultant magnetic particle brake current form. Both curves are plotted on the same time base.

Figure 4:
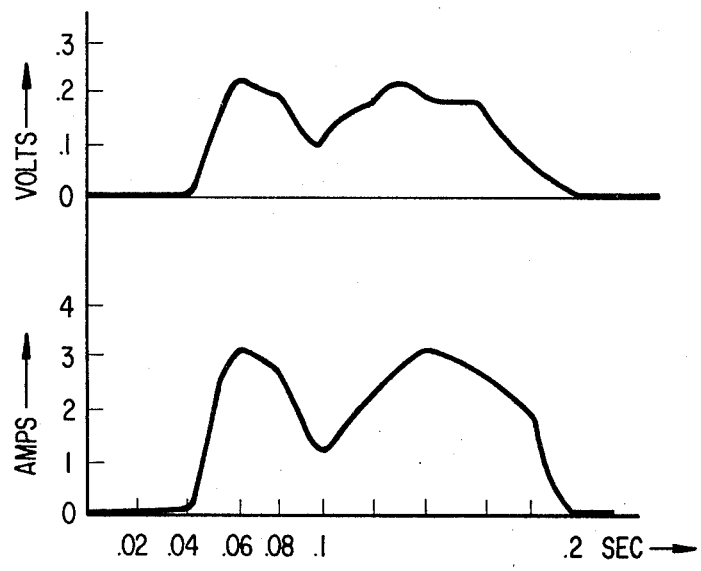
FIG. 4 are curves illustrating similar wave forms smoothed by a filter.

Referring to FIG. 4, for the same settings as those in FIG. 3, in the upper portion are similar voltage and current curves except that the connection as at the point X between taps 84 and junction 86 has been broken, a resistor inserted, and a capacitor connected between ground and junctions 86. In other words, a simple low-pass resistor capacitor smoothing network has been used. The smoothing action of the filter is apparent.

Figure 5:
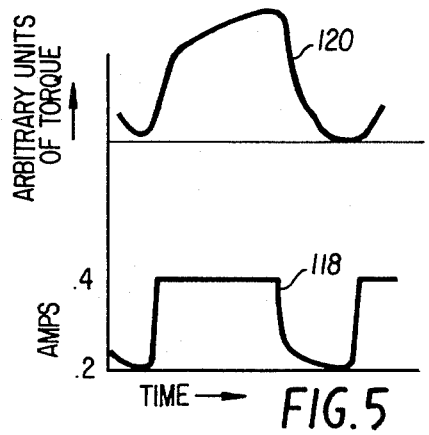
FIGS. 5 and 6 are curves somewhat idealized illustrating the brake torque on the same time base as the current through the magnetic brake.
Figure 6:
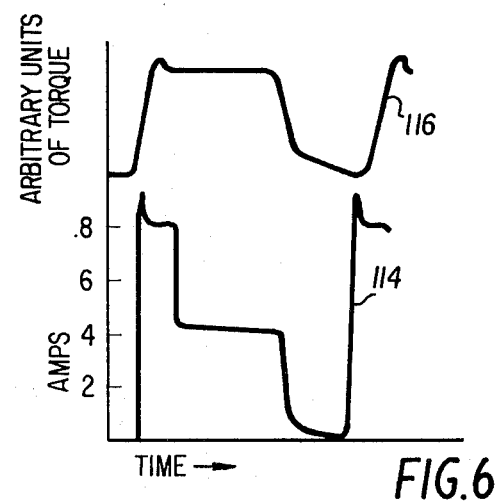

Referring to FIG. 5, there is illustrated in the lower portion an idealized oscilloscope tracing 118 of a current wave form applied to the brake 24, and in the upper curve 120 the corresponding torque resistance of the simulated limb in arbitrary units. In FIG. 6 is illustrated the application of an idealized oscilloscope tracing 114 of an applied current wave form and in the upper curve 116 the corresponding torque resistance shown in arbitrary units. The initial overshoot of the wave form 114 is employed in order to cause a sharp initial rise in torque, and then a flat response as illustrated in curve 116.

It will be apparent from the foregoing that the wave form generator in conjunction with the amplifiers 88 and 94 may be viewed as a program control unit which controls the current applied to the brake 24 to assume substantially any desired form. Accordingly resistance to torque of the joint of the simulated knee 10 to flexure in the sagittal plane may be programmed to follow a corresponding form. This programming capability provides a flexibility highly useful in the employment of the simulated limb 10 particularly in test environments.

While preferred embodiments of the invention have been described it will be appreciated by those skilled in the art that various changes can be made therein without departing from the scope of the invention in its broader aspects as defined in the appended claims.

What is claimed is:

1. A joint, two limb portions joined by said joint, and a magnetic particle brake having a braking torque responsive to current, positioned on one of said portions, a mechanically coupled to said joint, whereby the resistance of the limb portions about said joint is responsive to the brake current.

2. A joint as claimed in claim 1, the said magnetic brake being positioned remote from said joint.

3. An anthropomorphic articulation comprising two limb portions, a joint joining said limb portions comprising gearing, a current responsive magnetic particle brake carried by one of said limb portions and mechanically coupled to said gearing, and a circuit for applying current to said brake.

4. An anthropomorphic articulation as claimed in claim 3, the said magnetic brake being remote from said gearing.

5. A programmable anthropomorphic articulation as claimed in claim 3, said circuit further comprising means for programming to provide a desired current wave form as the current for application to said brake.

6. An articulation as claimed in claim 5, said limb portions simulating the upper and lower leg of a human being, said brake being carried by said upper limb portion at such a point that the center of gravity of said upper limb is located approximately at the point corresponding to that at which the human leg it simulates has its center of gravity.

7. A programmable anthropomorphic articulation as claimed in claim 3, the said limb portions corresponding respectively to the lower and upper portions of a leg and said articulation corresponding to the knee joint joining them, the gearing further comprising a bevel gear set arranged to transfer rotary motion of the said lower limb portion about the plane corresponding to the sagittal plane into a rotary motion about an axis of said upper limb portion.

* * * * *